July 26, 1960 K. ZÄNGL 2,946,375
PROCESS OF AND MACHINE FOR TREATING USED TIRES
Filed April 23, 1956 2 Sheets-Sheet 1

INVENTOR.
KARL ZÄNGL
BY

July 26, 1960 K. ZÄNGL 2,946,375
PROCESS OF AND MACHINE FOR TREATING USED TIRES
Filed April 23, 1956 2 Sheets-Sheet 2

INVENTOR.
KARL ZÄNGL
BY

2,946,375
PROCESS OF AND MACHINE FOR TREATING USED TIRES

Karl Zängl, Belgradstrasse 215–217, Munich 13, Germany

Filed Apr. 23, 1956, Ser. No. 580,125

Claims priority, application Germany Oct. 24, 1955

2 Claims. (Cl. 157—13)

This invention relates to machines for roughening, scraping and peeling of pneumatic rubber tires for retreading purposes.

There are already known machines of this type which possess a tire propping and clamping arrangement including a spreading lever system which is actuated by an axial displacement spindle drive to clamp or grip the tire in a centered condition. Alternatively, the tire is rotated by means of feed rollers gripping it on its inner and outer surfaces, in which case it is impossible to work or machine the tire in an exactly centered position.

There are also known other machines of this type in which a rotatably supported tire is set into rotation by means of a rotating working tool, the tire being braked in order to ensure that the tire and the tool do not rotate at the same angular velocity. In all of these known arrangements, the machining of the tire, i.e. the roughening or scraping of rubber from the tire, is effected while imparting a very low rotational speed to the tire.

It has also been the practice to roughen or scrape used tires in inflated condition, but this entails several disadvantages, inasmuch as the mounting and demounting of the tire on a wheel rim and the insertion and inflation of the inner tube require a considerable amount of time. In addition, the complete shaping or working of the tire, due to the small rotational velocity imparted thereto, consumes a further great amount of time.

It is, therefore, an important object of the present invention to provide means facilitating roughening and scraping of pneumatic rubber tires for the purpose of rerounding or retreading the same while substantially avoiding the drawbacks and disadvantages present in heretofore known machines and procedures for this purpose.

It is another object of the present invention to provide means enabling a non-inflated tire to be processed for retreading as aforesaid while being centrally clamped on a suitable supporting arrangement, and while being rotated to be treated by one or more tools guided against the outermost surface thereof.

Thus, it is also an object of the present invention to provide means affording a new process for rerounding or reshaping tires, which process differs fundamentally from heretofore known operations of this kind and is particularly characterized by the fact that the tire, while being worked upon, is rotated at a predetermined and controlled high speed by means of suitable drive or transmission means so that the resulting centrifugal forces render the tire surface to be machined or worked substantially rigid and unyielding.

A further object of the present invention is to provide means conducive to accurate stabilization of the tire in a simple manner while it is being worked or processed, the arrangement being such that the tire has the attributes of a rigid structure similar to that of a solid rigid mass or body mounted on a turning lathe.

Still a further object of the present invention is the provision of means contributing to a new process of rounding a tire by roughening and/or scraping, which process, due to removal of any possible unbalancing masses from the tire periphery at the beginning of the roughening and scraping procedure, produces a tire which exhibits a precisely centered, circular outer surface.

More specifically, it will be seen that a prerequisite for the most efficient, economical and accurate practice of the process according to the present invention is a precisely centered mounting of the tire, this being most advantageously effected by the mounting or clamping arrangement provided in accordance with the present invention.

These and other objects of the invention will become further apparent from the following detailed description, reference being made to the accompanying drawings, showing preferred embodiments of the invention.

Referring now more particularly to the drawings, the deflated pneumatic rubber tire 1 is first precisely centered and disposed in a vertical plane by means of a mounting or clamping arrangement provided with a plurality of bracing or expanding levers.

Figure 1:
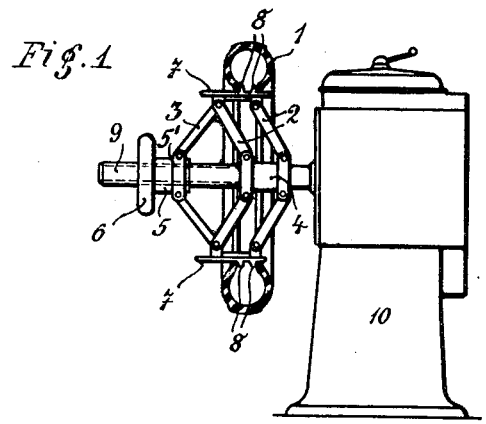
Fig. 1 is a side elevational view of a tire processing machine illustrating the tire mounting mechanism constructed in accordance with the present invention.

As may best be seen from Fig. 1, the propping or expanding levers of the tire-mounting means according to the present invention consist of a plurality of parallel lever pairs 2 and of a pair of actuating or control levers 3. The levers 2 are pivotally connected at one end to a stationary abutment 4, while the corresponding ends of the control levers 3 are pivotally connected to a strap 5' arranged on a nut 5, the strap being keyed to the nut so as to permit relative rotation while inhibiting relative axial displacement therebetween.

The nut 5 is threaded onto the outer end of a drive shaft 9. Thus, during displacement of the nut along the shaft upon rotation of the handwheel 6 which is connected to the nut, levers 2 and 3 maintain a series of clamping jaws or members 7 linked to the other ends or extremities of the levers properly positioned for movement into or out of their tire-clamping positions.

The same effect could, of course, be attained by a reversed arrangement, i.e., one in which the parallelogram-forming lever system 2 is linked to the displaceable nut 5 while the actuating or control levers 3 are linked to the fixed or stationary abutment 4.

It is to be noted that relative to the spreading or expanding levers of heretofore known arrangements in which the levers are displaced in opposite directions by means of a spindle provided with both right- and left-hand threads, respectively, the lever system of the present invention possesses the advantage that only one nut need be displaced, whereby the occurrence of undesired and harmful play or lost motion is reduced to a minimum.

The present invention, as indicated above, enables the tire 1 to be exactly and accurately centered on the clamping jaws 7 prior to (and which is of prime importance for) the performance of any work on the tire.

Specifically, precise centering of the tire is effected by the provision of a sufficiently large number of jaws 7 so as to ensure that the circular shape of the tire bead ring is maintained.

Thus, for use with passenger automobile tires (see Fig. 2) there are provided at least six clamping jaws, while for larger truck or bus tires, for example, a greater number of clamping jaws may be set up and employed. In any event, the number of jaws or tire-retaining members is such that a relatively closely spaced group of jaws is formed, thereby precluding an eccentric mounting or bulging of the tire.

Each clamping jaw 7 is provided on its gripping or tire-contacting surface with two transversely extending projections or abutments 8 for engaging the beads of the tire, one of these abutments being fixed in position while the other is adjustably arranged to accommodate tires of different sizes. The abutments 8 may be constructed in the form of ribs, bolts, hooks and the like, and serve to maintain the two tire beads uniformly spaced from one another over the entire peripheries thereof, whereby a lateral displacement or shifting of the tires is prevented.

The drive shaft 9 carries the above described tire-clamping or mounting arrangement 2 to 8 and is itself supported in the machine frame 10 in which are located a drive motor and a speed changing transmission (not shown) preferably of the infinitely variable type, by means of which the tire may be rotated at the desired speed.

As indicated hereinabove, according to known roughening procedures, the tire is rotated at relatively low speeds, for example, at 4 to 10 r.p.m.; i.e., at a very small peripheral velocity. One of the basic features of the present invention, however, is that a deflated tire is driven at a high rotational speed through the intermediary of a suitable transmission by means of which the speed of rotation can be correlated to the size of the tire.

The transmission is arranged to rotate passenger car tires at a speed corresponding to a road or driving speed of 30 to 50 m.p.h., while truck tires are rotated at a smaller rotational speed. At such rotational speeds the clamped or propped and non-inflated tire is stretched or expanded outwardly through the action of centrifugal forces and is rendered rigid or unyielding to such an extent that the surfaces to be worked upon do not yield under the pressure of the working tool, whereby the tire after being worked upon exhibits a precisely centered circular outer surface.

Figure 3:
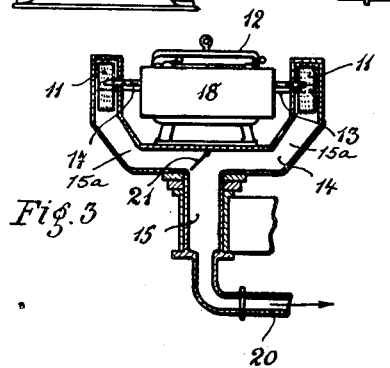
Fig. 3 is a sectional view of the bearing or supporting arrangement for the roughening means.
Figure 4:
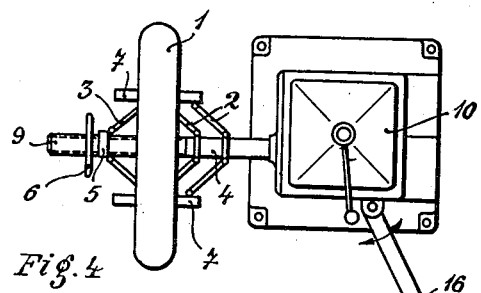
Fig. 4 is a top plan view of the machine of Fig. 2.
Figure 5:
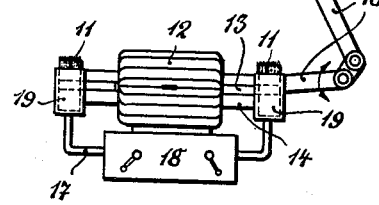
Figs. 5 and 6 illustrate operational and constructional details of the machine of the present invention.
Figure 5:
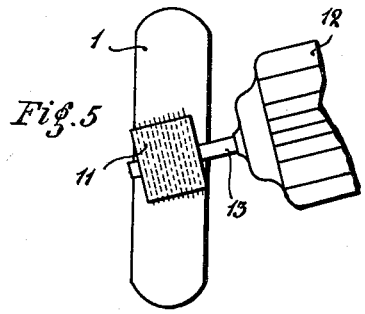

Mounted opposite the tire 1 are two roughening rollers or drums 11 which are mounted on a common shaft 13 together with their drive motor 12 (see Figs. 3, 4 and 5).

In accordance with the invention there is provided a hollow fork-shaped tool mounting frame structure 14 having a hollow upright stem 15 which is rotatably supported in arm or bracket means 16 linked or pivoted to the machine frame 10. In this manner, the frame structure 14 together with the roughening rollers 11 and motor 12 carried thereby may be horizontally displaced by means of a gripping rail or handle 17. This arrangement makes it possible to work on the tire 1 not only from the front, but also from both sides, the gripping handle 17 being manipulated to bring the two rollers 11 alternately or selectively into operative position relative to the tire sides.

It is of particular advantage that the motor 12 serves simultaneously as a support for a switch or control box 18, whereby the latter is located in the vicinity of the operator's hands and enables a central and common control of the motor for rotating the tire as well as of the motor 12 for rotating the rollers 11.

Figure 2:
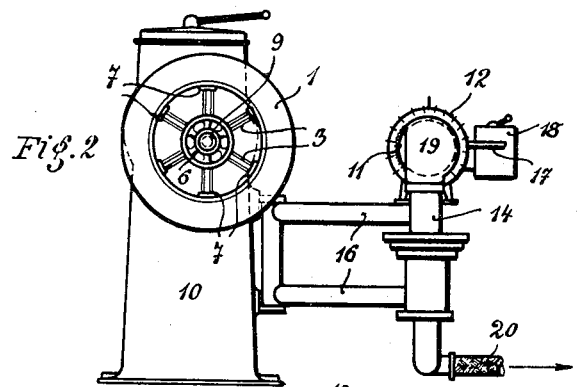
Fig. 2 is a similar view of the machine of Fig. 1 but taken at right angles to the viewing plane of Fig. 1 and illustrating the roughening means, some of the elements of Fig. 1 being omitted.

Two oppositely positioned suction passageways 15a extend laterally from the stem 15, and are formed at their upper ends with suction hoods 19 extending over the rollers 11 (see Figs. 2 and 4). In the suction hoods are located self-locking protective covers. The protective cover which is located in front of the inoperative roller 11 is automatically closed while the protective cover in front of the operating roller 11 is, of course, maintained in open position.

By virtue of the hollow construction of the frame structure 14 there is provided a suction channel or passageway of relatively large cross-section which communicates with a flexible suction conduit 20 leading to the atmosphere. Thus, during treatment of the tire, vapors, dust and rubber particles are exhausted. To enhance the exhaust or suction action that portion of the interior of the frame structure 14 leading to the inoperative roller 11 may be closed or obturated by means of a flap valve 21 so that the suction is directed to and concentrated upon the operating roller.

The shaft 13 together with the roughening rollers 11 and motor 12 may additionally be arranged for vertical swinging displacement. The roughening tools are always kept perpendicular to the axis of the shaft 13. An application of this arrangement is illustrated in Fig. 5 from which it may be seen that the roughening means of the rollers 11 are perpendicular to the shaft 13. The individual cutting paths of the roughening means overlap one another and thereby result in a uniform grooveless roughened surface on the vertically rotating tire. In heretofore known machines this was attained by mounting the roughening means in helical or other curved arrangements on the rollers, or the latter had to be horizontally reciprocated by special actuating mechanisms.

Figure 6:
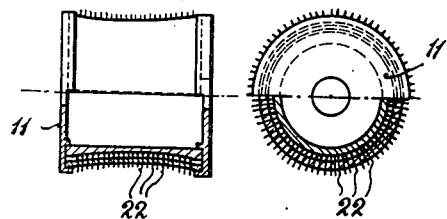

Referring now to Fig. 6, it will be seen that insertion of the roughening means or elements 22 into the shells or drums 11 is facilitated by the fact that the latter are split in half and may be taken apart, whereby the roughening elements 22 may be easily inserted into said shells.

It is further possible to construct the rollers 11 in a concave shape to thereby adapt them approximately to the running or road-contacting surface of the tire.

It is also to be noted that where scraping or peeling blades are to be employed, the latter may be adjustably arranged between two fixed or adjustably mounted roughening rollers which thus regulate the cutting depth of the blades. This occurs by virtue of the fact that the rollers roll along the tire and thus prevent too great a penetration of the blades into the tire which would result in damage of the plies of the tire.

Furthermore, the tire rotates at such a high, controlled speed that upon placing of a steel brush fixed to a suitable handle against the surface of the tire the latter is thoroughly cleaned, or if a roughening grater or napping scraper is employed, the surface of the tire may be automatically subjected to a roughening operation.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A machine for treating the surface of a tire comprising a tool supporting frame member including a hollow upright stem and two oppositely positioned suction passageways extending laterally from said stem, said passageways being provided with hoods, respectively, a motor supported by said frame member between said suction passageways, a rotatable shaft operated by said motor and extending into each of said suction passageways, rotatable tire scraping tool means located within said passageways and mounted on said shaft, each hood having an upper portion adapted to extend over said tool means to shield the latter, said suction passageways including a conduit leading away from said stem, and means for connecting said frame member with a tire support to locate said frame member in operative position relative to the surface of a tire to be treated by said tool means, so that particles derived from said operation may be exhausted through said passageways and said stem to said conduit.

2. An apparatus for treating the surface of a tire comprising a support for a tire, rotatable tool means for engaging the surface of a time, comprising a tool supporting frame member including a hollow upright stem having a top and a bottom opening and two oppositely positioned suction passageways extending laterally from said top opening and provided with hoods, said passageways being interconnected at said top opening, motor means supported by said frame member between said passageways, rotatable shaft means operated by said motor means and extending into each of said suction passageways, said tool means being located within said passageways and mounted on said shaft means, each hood having an upper portion adapted to extend over said tool means to shield the latter, said suction passageways including a conduit leading away from said stem, flap valve means positioned adjacent said top stem opening and adapted to close off either one of said passageways from said top opening, while leaving open the other of said passageways, and means connecting said frame member with said tire support to locate said frame member in operative position relative to the surface of a tire to be treated by said tool means so that particles derived from said operation may be exhausted through said open passageway and said stem to said conduit.

References Cited in the file of this patent

UNITED STATES PATENTS

| | | |
|---|---|---|
| 897,603 | Duncan | Sept. 1, 1908 |
| 1,234,443 | Buerk | July 24, 1917 |
| 1,532,707 | Fay | Apr. 7, 1925 |
| 1,814,875 | Weber | July 14, 1931 |
| 1,832,104 | Drake | Nov. 17, 1931 |
| 1,914,832 | Mellwig | June 20, 1933 |
| 2,009,524 | Schmidt | July 30, 1935 |
| 2,201,976 | Barnhart | May 28, 1940 |
| 2,216,008 | Henacker | Sept. 24, 1940 |
| 2,243,707 | James | May 27, 1941 |
| 2,293,585 | Bard | Aug. 18, 1942 |
| 2,364,384 | Oakes | Dec. 5, 1944 |
| 2,696,701 | Schaufelberger | Dec. 14, 1954 |

FOREIGN PATENTS

| | | |
|---|---|---|
| 894,388 | France | Mar. 13, 1944 |